US012595182B2

(12) United States Patent
    Komatsubara

(10) Patent No.: US 12,595,182 B2
(45) Date of Patent: Apr. 7, 2026

(54) METHOD FOR PRODUCING CHEMICAL-TREATED METAL OXIDE POWDER

(71) Applicant: TOKUYAMA CORPORATION, Yamaguchi (JP)

(72) Inventor: Tadaharu Komatsubara, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 723 days.

(21) Appl. No.: 17/638,931

(22) PCT Filed: Aug. 4, 2020

(86) PCT No.: PCT/JP2020/029846
    § 371 (c)(1),
    (2) Date: Feb. 28, 2022

(87) PCT Pub. No.: WO2021/044788
    PCT Pub. Date: Mar. 11, 2021

(65) Prior Publication Data
    US 2022/0289581 A1      Sep. 15, 2022

(30) Foreign Application Priority Data
    Sep. 2, 2019    (JP) ................................. 2019-159731

(51) Int. Cl.
    *C01B 33/18*          (2006.01)
(52) U.S. Cl.
    CPC .......... *C01B 33/18* (2013.01); *C01P 2006/12* (2013.01)
(58) Field of Classification Search
    CPC ... C01B 33/18; C01P 2006/12; C01P 2004/03
    See application file for complete search history.

(56) References Cited

U.S. PATENT DOCUMENTS 4,015,031 A      3/1977  Reinhardt et al.
5,686,054 A  *  11/1997  Barthel ..................... C09C 3/12
                                              423/625

(Continued)

FOREIGN PATENT DOCUMENTS

CN          101196700 A      6/2008
CN          101200601 A      6/2008

(Continued)

OTHER PUBLICATIONS

Hiromasa et al. (JP2014201454A English Machine Translation (Year: 2014).*

(Continued)

*Primary Examiner* — Sally A Merkling
*Assistant Examiner* — Jordan W Taylor
(74) *Attorney, Agent, or Firm* — Casimir Jones, S.C.; Thomas J. Lyneis

(57)                ABSTRACT

Aggregation of metal oxide powder is appropriately reduced. A method for chemical treatment of metal oxide powder (M) includes: a heating step (S10) of introducing the metal oxide powder (M) into a preheated stirring vessel (110) and performing heating while stirring the metal oxide powder (M) with a stirring blade (140); and a mixing step (S20) of adding a chemical agent to the metal oxide powder (M) and mixing the metal oxide powder (M) and the chemical agent while stirring the metal oxide powder (M) and the chemical agent with the stirring blade (140), wherein a rotation speed of the stirring blade (140) is lower in the mixing step (S20) than in the heating step (S10).

4 Claims, 7 Drawing Sheets

(56) References Cited

U.S. PATENT DOCUMENTS

| | | | | | |
|---|---|---|---|---|---|
| 5,714,299 | A | * | 2/1998 | Combes | ............. G03G 9/09716 |
| | | | | | 430/137.1 |
| 9,098,001 | B2 | * | 8/2015 | Tashiro | .............. G03G 9/09716 |
| 9,239,528 | B2 | * | 1/2016 | Hasegawa | ............ G03G 9/0804 |

FOREIGN PATENT DOCUMENTS

| | | | |
|---|---|---|---|
| CN | 101206413 | A | 6/2008 |
| CN | 103265826 | A | 8/2013 |
| CN | 105504433 | A | 4/2016 |
| CN | 109369127 | A | 2/2019 |
| EP | 1316589 | A2 | 6/2003 |
| JP | 51-120996 | | 10/1976 |
| JP | 10-118479 | A | 5/1998 |
| JP | 10-130624 | | 5/1998 |
| JP | 2002-146233 | | 5/2002 |
| JP | 2004-67475 | | 3/2004 |
| JP | 2004-359476 | | 12/2004 |
| JP | 2004359476 | A | * 12/2004 |
| JP | 2006-53458 | | 2/2006 |
| JP | 2014201454 | A | * 10/2014 |
| JP | 2017104770 | A | * 6/2017 |

OTHER PUBLICATIONS

Komatsubara et al. (JP2004359476A English Machine Translation; cited in IDS dated May 12, 2022) (Year: 2004).*
Kamaly et al. Advanced Power Technology, 2017, 28, 2357-2365 (Year: 2017).*
Akakishi et al. (JP2017104770A English) (Year: 2017).*
Written Opinion for PCT/JP2020/029846 and its English translation (International Preliminary Report on Patentability, mailed Oct. 27, 2020, 4 pages.
International Search Report for PCT/JP2020/029846 and its English translation, mailed Oct. 27, 2020, 2 pages.
Extended European Search Report for EP Patent Application No. 20860799.4, dated Sep. 2, 2024, 7 pages.

* cited by examiner

METHOD FOR PRODUCING CHEMICAL-TREATED METAL OXIDE POWDER

TECHNICAL FIELD

The present invention relates to a method for chemical treatment of metal oxide powder and a method for producing the metal oxide powder.

BACKGROUND ART

A method in which metal oxide powder, such as silica powder, is subjected to chemical treatment to, for example, add functionality, such as hydrophobicity, to the surface of the metal oxide powder is known as the conventional technique.

For example, Patent Literature 1 discloses a method in which silica powder is subjected to chemical treatment by adding a silane coupling agent to silica powder having an average particle diameter of not more than 1.0 μm in a state of being suspended in a gas blown into the silica powder.

Further, Patent Literature 2 discloses a method in which the surface of silica powder is hydrophobized by adding organosilane to dry silica powder while stirring and heating the silica powder.

CITATION LIST

Patent Literature

Patent Literature 1:
Japanese Patent Application Publication Tokukai No. 2002-146233
Patent Literature 2:
Japanese Patent Application Publication, Tokukaisho, No. 51-120996

SUMMARY OF INVENTION

Technical Problem

Unfortunately, the method presented in Patent Literature 1 has the problem that it requires a filtration device for collecting the silica powder suspended by the gas and increases the cost of processing the silica powder.

Further, as for metal oxide powder, it is generally known that a specific surface area has a great impact on aggregability. In a case where, particularly, metal oxide powder having a specific surface area which makes aggregability high is subjected to chemical treatment by the conventional technique as presented in Patent Literature 2, mechanical shear energy is applied to the metal oxide powder, and the metal oxide powder may aggregate and form lumps.

An object of an aspect of the present invention is to appropriately reduce aggregation of metal oxide powder in chemical treatment of the metal oxide powder.

Solution to Problem

In order to solve the above problems, a method for chemical treatment of metal oxide powder in accordance with an aspect of the present invention includes: a heating step of introducing metal oxide powder having a specific surface area of not less than 20 m²/g and not more than 40 m²/g into a stirring vessel which has been preheated to a temperature of not lower than 220° C., and, while stirring the metal oxide powder with a stirring blade, performing heating so that a temperature inside the stirring vessel which temperature has been decreased by the introduction of the metal oxide powder reaches the temperature of not lower than 220° C. again; and a mixing step of, after the temperature inside the stirring vessel has reached the temperature of not lower than 220° C. again in the heating step, adding a chemical agent to the metal oxide powder and mixing the metal oxide powder and the chemical agent while stirring the metal oxide powder and the chemical agent with the stirring blade, wherein a rotation speed of the stirring blade is lower in the mixing step than in the heating step.

A method for producing chemical-treated metal oxide powder in accordance with an aspect of the present invention includes: a heating step of introducing metal oxide powder having a specific surface area of not less than 20 m²/g and not more than 40 m²/g into a stirring vessel which has been preheated to a temperature of not lower than 220° C., and, while stirring the metal oxide powder with a stirring blade, performing heating so that a temperature inside the stirring vessel which temperature has been decreased by the introduction of the metal oxide powder reaches the temperature of not lower than 220° C. again; and a mixing step of, after the temperature inside the stirring vessel has reached the temperature of not lower than 220° C. again in the heating step, adding a chemical agent to the metal oxide powder and mixing the metal oxide powder and the chemical agent while stirring the metal oxide powder and the chemical agent with the stirring blade, wherein a rotation speed of the stirring blade is lower in the mixing step than in the heating step.

Advantageous Effects of Invention

According to an aspect of the present invention, it is possible to appropriately reduce aggregation of metal oxide powder in chemical treatment of the metal oxide powder.

DESCRIPTION OF EMBODIMENTS

Figure 1:
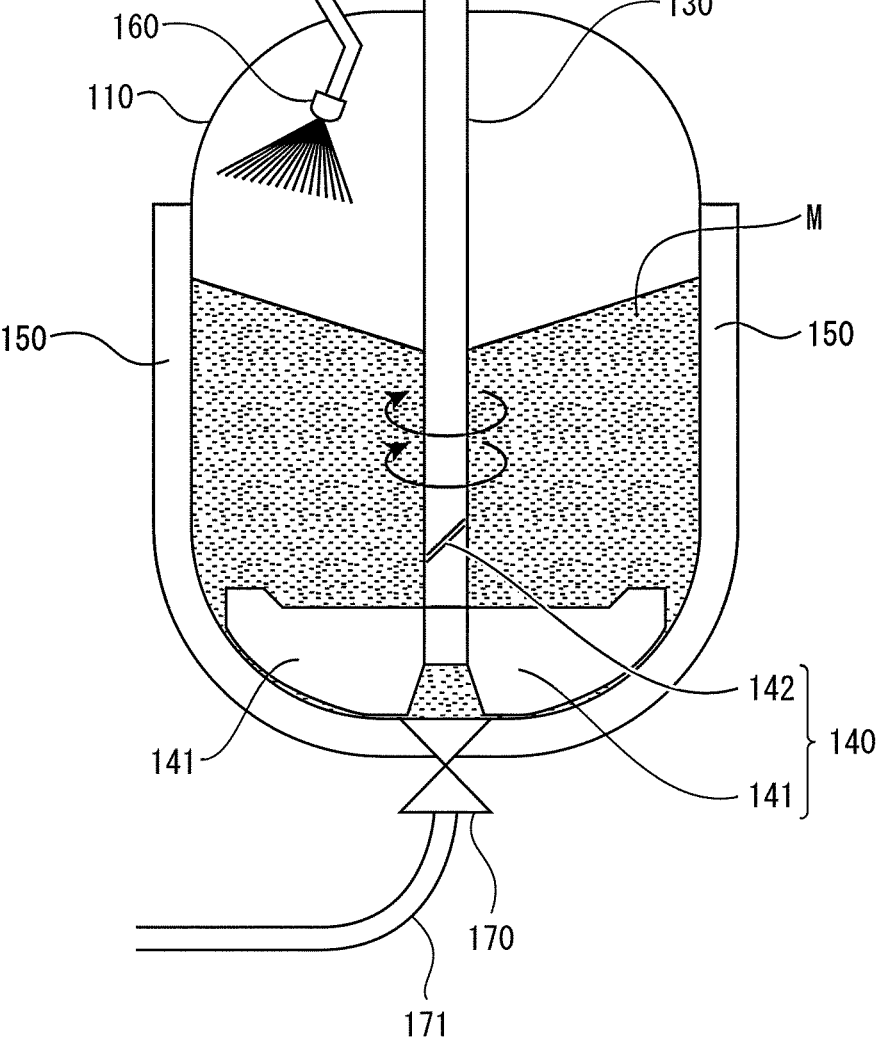
FIG. 1 is a diagram schematically showing a side surface of a stirring device in accordance with an embodiment of the present invention.

The following description will discuss an embodiment of the present invention in detail.

[1. Metal Oxide Powder]

In the present specification, "metal" includes not only metals in a narrow sense but also materials generally called semimetals or semiconductors. Thus, "metal oxides" include an oxide of a metal, an oxide of a semimetal, and a composite oxide containing a metal and a semimetal. Examples of the metal oxides include: metal oxides in a narrow sense such as alumina ($Al_2O_3$), titania ($TiO_2$), zirconia ($ZrO_2$), magnesia (MgO), iron oxide, copper oxide, zinc oxide, tin oxide, tungsten oxide, and vanadium oxide; metal oxides in a broad sense such as silica ($SiO_2$); and composite metal oxides such as silica-alumina, silica-titania, and silica-titania-zirconia.

The metal oxide powder that can be used in an embodiment of the present invention may be, for example, silica or composite metal oxide powder containing silica as a main component. Silica can be produced by any method, and, for example, may be dry silica which is produced by combustion hydrolysis of silicon tetrachloride or an organosilicon compound, or may be sol-gel silica which is produced by hydrolyzing silicon alkoxide in a liquid.

As for metal oxide powder, it is generally known that a larger specific surface area correlates to higher aggregability. According to diligent study conducted by the inventor of the present invention, metal oxide powder having a specific surface area of more than 40 $m^2/g$ has primary particles of a very small particle diameter of, for example, about 10 nm, and has very high aggregability. However, these primary particles aggregate to form secondary particles having a particle diameter of, for example, about 10 μm to 100 μm, and aggregability between the secondary particles becomes low. As a result, apparent aggregability of the powder becomes low. Note that in the present specification, the "primary particles" mean basic constituent particles of a substance, and the "secondary particles" mean particles which are formed by aggregation of the primary particles.

Further, metal oxide powder having a specific surface area of less than 20 $m^2/g$ is such that aggregability between primary particles is low. Thus, the metal oxide powder having a specific surface area of more than 40 $m^2/g$ and the metal oxide powder having a specific surface area of less than 20 $m^2/g$ can be subjected to chemical treatment by the conventional technique as presented in Patent Literature 2.

However, metal oxide powder having a specific surface area of not less than 20 $m^2/g$ and not more than 40 $m^2/g$ has difficulty in forming secondary particles and has high aggregability between primary particles. When such metal oxide powder is subjected to chemical treatment by the conventional technique, mechanical shear energy is applied to the metal oxide powder, and the metal oxide powder may aggregate and form lumps.

When the metal oxide powder aggregates and forms lumps during stirring, the lumps of the aggregated metal oxide powder may adhere to, for example, an inner wall surface of a stirring vessel. In this case, not only a collection rate of the metal oxide powder is decreased, but also the lumps of the aggregated metal oxide powder remain inside the stirring vessel. This limits the amount of metal oxide powder to be introduced in a subsequent batch and thus results in reduction in processing efficiency.

In addition, the lumps of the aggregated metal oxide powder adhering to the inner wall surface of the stirring vessel may peel off during stirring. When the lumps of the metal oxide powder having peeled off come into contact with a stirring blade, abnormal vibrations are generated in the stirring blade, and an abnormal load is applied to a motor of a stirring device. This may cause a failure of the stirring device. In addition, the lumps of the metal oxide powder having peeled off may clog piping for transporting the metal oxide powder. In this case, a great deal of labor is required to remove the lumps of the metal oxide powder.

In view of this, the metal oxide powder used in an embodiment of the present invention is metal oxide powder having a specific surface area of not less than 20 $m^2/g$ and not more than 40 $m^2/g$, and particularly preferably metal oxide powder having a specific surface area of not less than 25 $m^2/g$ and not more than 35 $m^2/g$. The metal oxide powder having a specific surface area of not less than 20 $m^2/g$ and not more than 40 $m^2/g$, particularly not less than 25 $m^2/g$ and not more than 35 $m^2/g$, has high aggregability and is thus difficult to subject to chemical treatment by the conventional technique. However, according to an aspect of the present invention, even in a case where such metal oxide powder having high aggregability is subjected to chemical treatment, it is possible to appropriately reduce the aggregation of the metal oxide powder.

Note that the specific surface area in the present specification is a specific surface area that is measured by the nitrogen adsorption BET single-point method. The specific surface area can be measured with a commercially available specific surface area meter, and can be measured using, for example, a specific surface area measuring device SA-1000 manufactured by Shibata Rikagaku Co., Ltd.

The degree of aggregation of the metal oxide powder and the chemical-treated metal oxide powder both of which are used in an embodiment of the present invention can be evaluated by measuring the bulk density. The higher the bulk density of the metal oxide powder, the denser the particles of the metal oxide powder are. This suggests that the metal oxide powder has a higher degree of aggregation. On the other hand, the lower the bulk density of the metal oxide powder, the less dense the particles are in the metal oxide powder. This suggests that the metal oxide powder has a lower degree of aggregation. Note that in the present specification, the "degree of aggregation" means a measure of how much metal oxide powder actually aggregates, and the "aggregability" means the tendency of metal oxide powder to aggregate. The bulk density of metal oxide powder can be measured according to, for example, JIS 5101-12-1: Test methods for pigments.

[2. Chemical Agent]

In an embodiment of the present invention, as a chemical agent used for chemical treatment of the metal oxide powder, a known chemical agent which is typically used for surface treatment of metal oxide powder or the like treatment can be used without any particular limitation. Examples of the chemical agent include, but are not particularly limited to, a surface treatment agent, a pharmacological component having various medicinal effects, and the like. The surface treatment agent is a chemical agent for changing surface physical properties of metal oxide powder. The above-described pharmacological component is a component for exerting a pharmacological action on a living organism, and the pharmacological component can be supported by metal oxide powder by applying a chemical treatment method in accordance with an aspect of the present invention. As the chemical agent, only one of the chemical agents may be used alone. Alternatively, two or more of the chemical agents may be used in combination.

Examples of the surface treatment agent include a silane-based compound, silicone oil, a silane coupling agent, a titanate-based coupling agent, an aluminate-based coupling agent, and the like. Further, various known carboxylic acids, amines, or alcohols may be used as the surface treatment agent.

Examples of the silane-based compound include a silicon-based compound in which part of hydrogen atoms of silane or disilazane is substituted with an alkyl group, an alkoxy group, a phenyl group, a halogen, or the like. From the viewpoint of high reactivity and easy handling, the silane-based compound is preferably hexamethyldisilazane (HMDS).

The amount of the silane-based compound added is not particularly limited, but is preferably 0.1 parts by mass to 100 parts by mass, and more preferably 1 part by mass to 50 parts by mass, relative to 100 parts by mass of silica particles used. When the amount of the silane-based compound added is not less than 0.1 parts by mass, it is possible to sufficiently surface-treat metal oxide powder. Further, when the amount of the silane-based compound added is not more than 100 parts by mass, post-treatment is easily performed.

Examples of the silicone oil include dimethyl silicone oil, methylphenyl silicone oil, methylhydrogen silicone oil, alkyl-modified silicone oil, amino-modified silicone oil, epoxy-modified silicone oil, carboxyl-modified silicone oil, carbinol-modified silicone oil, methacryl-modified silicone oil, polyether-modified silicone oil, fluorine-modified silicone oil, and the like. The silicone oil is used to, for example, efficiently hydrophobize the surface of metal oxide powder. To efficiently hydrophobize the surface of metal oxide powder by surface treatment, the silicone oil is preferably dimethyl silicone oil.

The amount of the silicone oil added is not particularly limited, but is preferably 0.05 parts by mass to 20 parts by mass, and more preferably 0.1 parts by mass to 10 parts by mass, relative to 100 parts by mass of silica particles used. When the amount of the silicone oil added is not less than 0.05 parts by mass, it is possible to sufficiently chemical-treat metal oxide powder. Further, when the amount of the silicone oil added is not more than 20 parts by mass, post-treatment is easily performed.

Examples of the silane coupling agent include methyltrimethoxysilane, methyltriethoxysilane, hexyltrimethoxysilane, decyltrimethoxysilane, phenyltriethoxysilane, vinyltrimethoxysilane, vinyltriethoxysilane, 3-methacryloyloxypropyltrimethoxysilane, 3-methacryloyloxypropyltriethoxysilane, 3-acryloyloxytrimethoxysilane, 3-glycidoxypropyltrimethoxysilane, 3-glycidoxypropyltriethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, N,N-dimethyl-3-aminopropyltrimethoxysilane, N,N-diethyl-3-aminopropyltrimethoxysilane, 4-styryltrimethoxysilane, and the like.

The silane coupling agent is used to, for example, efficiently hydrophobize the surface of metal oxide powder. To efficiently hydrophobize the surface of metal oxide powder by surface treatment, the silane coupling agent is preferably methyltrimethoxysilane, methyltriethoxysilane, hexyltrimethoxysilane, or decyltrimethoxysilane.

The amount of the silane coupling agent added is not particularly limited, but is preferably 0.05 parts by mass to 70 parts by mass, and more preferably 0.1 parts by mass to 35 parts by mass, relative to 100 parts by mass of the silica particles used. When the amount of the silane coupling agent added is not less than 0.05 parts by mass, it is possible to sufficiently chemical-treat metal oxide powder. Further, when the amount of the silane coupling agent added is not more than 70 parts by mass, post-treatment is easily performed.

As other detailed conditions used in the chemical treatment method using the surface treatment agent, known conditions may be selected as appropriate according to, for example, the type of surface treatment agent used and the type of metal oxide used.

Examples of the pharmacological component include: antioxidant agents such as vitamins (e.g., vitamin B2 and vitamin C), carotenoids (e.g., α-carotene, β-carotene, and astaxanthin), polyphenols (e.g., fluorotannin, anthocyanin, and the like), lactoferrin, and ergothioneine; cell-activating agents such as collagen, elastin, yeast extract, lactobacillus extract, and *Ganoderma lucidum* extract; blood flow-promoting agents including plant extracts such as *Ginkgo biloba* extract, swertia herb extract, and Aesculus hippocastanum extract, carpronium chloride, cepharanthin and the like, vitamin E and its derivatives, capsicum tincture, sodium dextran sulfate, ginseng extract, and extracts from seaweeds and the like; melanin production inhibitors such as arbutin, mulberry bark extract, peony root extract, glycyrrhiza root extract, kojic acid, placenta extract, and potassium 4-methoxysalicylate; turnover accelerators such as ascorbic acid glucoside, magnesium ascorbyl phosphate, sodium ascorbyl phosphate, ascorbyl ethyl, disodium ascorbyl sulfate, glyceryl ascorbate, adenosine monophosphate disodium OT, and proteoglycan; hair follicle activators such as pantothenic acid and its derivatives, placenta extract, biotin, photosensitizer 301, and 6-benzylaminopurine; and anti-inflammatory agents such as ε-aminocaproic acid, lysozyme chloride, guaiazulene, glycyrrhetinic acid and its derivatives, licorice extract, chamomile extract, *Lithospermum erythrorhizon* root extract, *Perilla frutescens* extract, mulberry bark extract, angelica acutiloba extract, peach leaf extract, and polyphenol-containing plant extracts; and the like.

Further, in an aspect of the present invention, other examples of the chemical agent that can be supported by the metal oxide powder include: ultraviolet absorbers such as glycol salicylate, hydroxymethoxybenzophenone sulfonic acid, sodium hydroxymethoxybenzophenone sulfonate, sodium dihydroxydimethoxybenzophenone disulfonate, terephthalylidene dicamphor sulfonic acid, methylene bis-benzotriazolyl tetramethylbutylphenol, and phenylbenzimidazole sulfonic acid; and vitamins such as vitamin B6 group, nicotinic acid amide, calcium pantothenate, biotin, and vitamin C group.

[3. Stirring Vessel]

In an embodiment of the present invention, as the stirring device used for chemical treatment of the metal oxide powder, a known stirring device which is typically used for stirring metal oxide powder can be used without any particular limitation.

Figure 2:
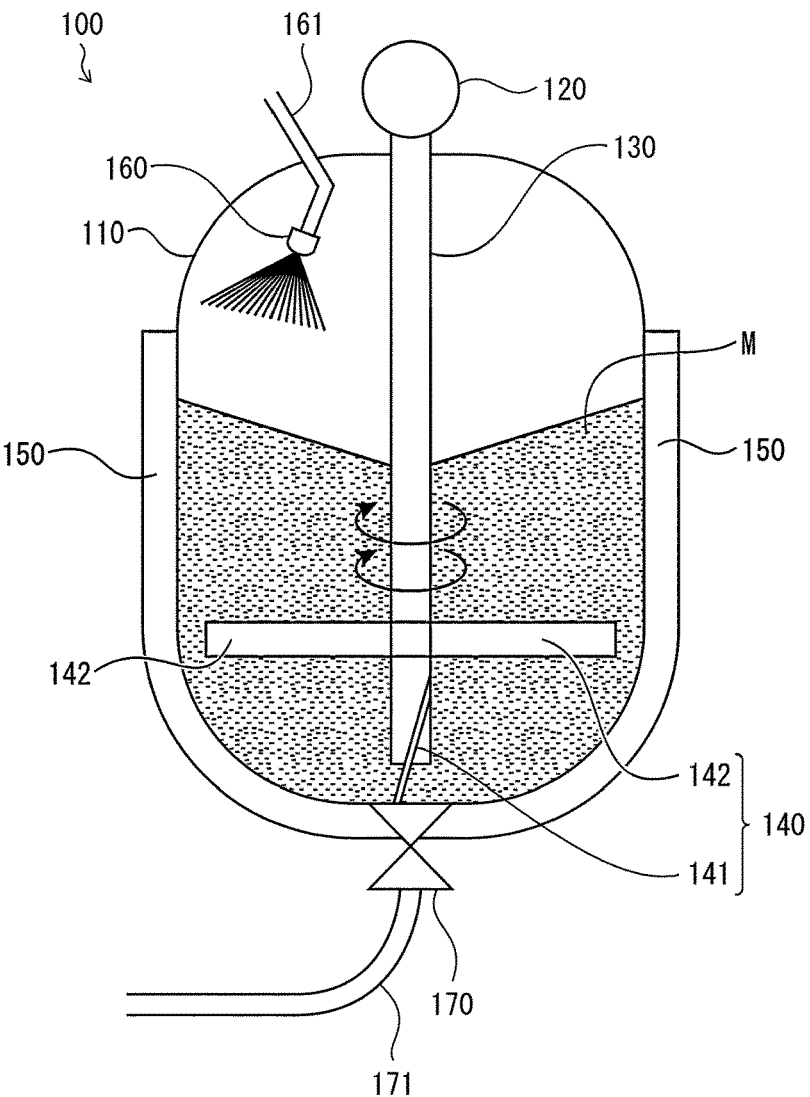
FIG. 2 is a diagram schematically illustrating a side surface of a stirring device, the diagram illustrating a state in which a stirring blade of the stirring device illustrated in FIG. 1 is arranged at a position rotated through 90 degrees about a stirring shaft.

As illustrated in FIG. 1, a stirring device 100 that can be used in an embodiment of the present invention includes a stirring vessel 110, a motor 120, a stirring shaft 130, a stirring blade 140, a jacket 150, a nozzle 160, and an outlet 170. FIG. 2 is a diagram schematically illustrating a side surface of a stirring device, the diagram illustrating a state in which the stirring blade 140 of the stirring device 100 illustrated in FIG. 1 is arranged at a position rotated through 90 degrees about the stirring shaft 130.

The stirring vessel 110 has a bottom that is curved downward so as to be suitable for stirring metal oxide powder M. The stirring vessel 110 is such that at least an inner wall surface of the stirring vessel 110 is formed of a material which does not react with the metal oxide powder M. Inside the stirring vessel 110, a temperature sensor (not illustrated) for measuring a temperature inside the stirring vessel 110 is provided.

The motor 120 is a member for rotating the stirring blade 140 inside the stirring vessel 110 via the stirring shaft 130. The motor 120 is installed above the stirring vessel 110. As the motor 120, a known motor which is typically used for stirring metal oxide powder can be used without any particular limitation. Examples of the motor 120 include an electric motor. The motor 120 is connected to a transmission (not illustrated) and is configured so as to change a rotation speed of the stirring blade 140 as required.

The stirring shaft 130 is a member for transmitting power from the motor 120 to the stirring blade 140. As the stirring shaft 130, a known stirring shaft which is typically used for stirring metal oxide powder can be used without any particular limitation. The stirring shaft 130 is such that at least a surface of the stirring shaft 130 is formed of a material which does not react with the metal oxide powder M.

The stirring blade 140 is a member for stirring the metal oxide powder M introduced into the stirring vessel 110. As the stirring blade 140, a known stirring blade which is typically used for stirring metal oxide powder can be used without any particular limitation. The stirring blade 140 is such that at least a surface of the stirring blade 140 is formed of a material which does not react with the metal oxide powder M.

The rotation of the stirring blade 140 contributes to a circulating action and a shearing action on the metal oxide powder M. Note, here, that the circulating action is an action of forming a circulation flow by sucking and discharging the metal oxide powder M, which is an object being stirred, and contributes to homogenization in the stirring vessel. Further, the shearing action is an action of giving a speed difference to a fluid of the metal oxide powder M, which is an object being stirred. In an embodiment of the present invention, the shearing action may cause aggregation of the metal oxide powder M. Therefore, as the stirring blade 140, a stirring blade which is shaped to have a high circulation capability and a low shearing capability is preferably used from the viewpoint of reducing the aggregation of the metal oxide powder M.

Examples of the stirring blade having a high circulation capability and a low shearing capability include, but are not limited to, an anchor blade having a shape extending along the bottom of the stirring vessel 110, a long slender plate-shaped paddle blade, and the like. These blades may be used in combination. In the example illustrated in FIG. 1, a pair of anchor blades 141 are provided at a lower end of the stirring shaft 130. Further, as illustrated in FIG. 2, a pair of paddle blades 142 are provided above the anchor blades 141 on the stirring shaft 130.

The pair of anchor blades 141 are 180 degrees apart from each other with respect to the stirring shaft 130, and the anchor blades 141 are each slightly inclined with respect to a direction in which the stirring shaft 130 stretches. Further, the pair of paddle blades 142 are 180 degrees apart from each other with respect to the stirring shaft 130, and are provided at positions orthogonal to the pair of anchor blades 141. The pair of paddle blades 142 are each inclined 45 degrees with respect to the direction in which the stirring shaft 130 stretches. The entire stirring blade 140 is formed 180 degrees rotationally symmetric with respect to the stirring shaft 130.

The jacket 150 is a heating jacket for heating the stirring vessel 110, and is configured so as to cover the side surface and bottom surface of the stirring vessel 110 from the outside of the stirring vessel 110. As the jacket 150, a known jacket which is typically used for heating a stirring vessel can be used without any particular limitation.

The nozzle 160 is a member for adding a chemical agent to the inside of the stirring vessel 110. In the examples of FIGS. 1 and 2, the nozzle 160 is provided in an upper portion of an inner part of the stirring vessel 110, and is connected to the outside of the stirring vessel 110 by a chemical agent pipe 161. The nozzle 160 has a tip that faces downward, and is configured such that a chemical agent can be added to the metal oxide powder M from above. As will be described later, the nozzle 160 is preferably a spray nozzle that is capable of spraying a chemical agent in a state of a stock solution or a solution.

The outlet 170 is a valve for causing the chemical-treated metal oxide powder M to flow out of the stirring vessel 110, and is connected to an outflow pipe 171. The chemical-treated metal oxide powder M is caused to flow out through the outflow pipe 171 by pressure of a gas such as air or nitrogen.

The stirring device 100 may be provided with, in addition to the above-described members, other members (not illustrated) including, for example, a baffle (also referred to as a baffle plate), provided inside the stirring vessel 110, for forming a vertical circulation flow of the metal oxide powder M and an inlet for introducing the metal oxide powder M.

[4. Method for Chemical Treatment of Metal Oxide Powder]

Figure 3:
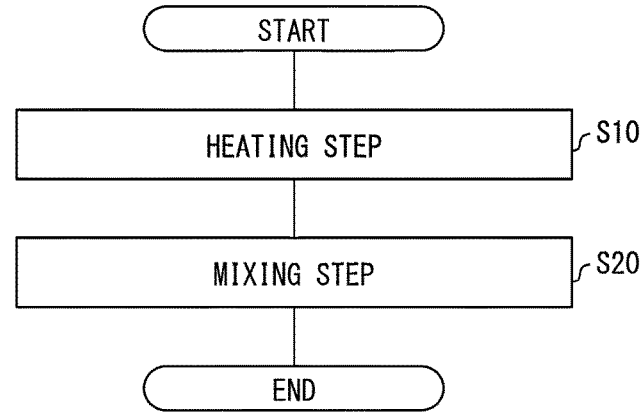
FIG. 3 is a flowchart showing a method for chemical treatment of metal oxide powder in accordance with an embodiment of the present invention.

A method for chemical treatment of the metal oxide powder M will be described below. As illustrated in FIG. 3, first, the stirring vessel 110 is heated by the jacket 150, and it is confirmed with a temperature sensor (not illustrated) provided inside the stirring vessel 110 that the inside of the stirring vessel 110 has been preheated to a temperature that is equal to or higher than a temperature at which the metal oxide powder M is less likely to aggregate. The temperature at which the metal oxide powder M is less likely to aggregate only needs to be, for example, a temperature not lower than 220° C. Further, the temperature at which the metal oxide powder M is less likely to aggregate is more preferably not lower than 230° C., even more preferably not lower than 240° C., still more preferably not lower than 250° C., even more preferably not lower than 260° C., still more preferably not lower than 270° C., further more preferably not lower than 280° C., still further more preferably not lower than 290° C., and yet further preferably not lower than 300° C.

Next, the metal oxide powder M is introduced into the preheated stirring vessel 110 and is stirred by the stirring blade 140. The temperature inside the stirring vessel 110 is decreased by the introduction of the metal oxide powder M. Then, while the metal oxide powder M is stirred by the stirring blade 140, the stirring vessel 110 is heated by the jacket 150 until the decreased temperature inside the stirring vessel 110 reaches a temperature not lower than 220° C., which is the temperature at which the metal oxide powder M is less likely to aggregate, again (S10: heating step).

It is generally known that the higher the temperature of the metal oxide powder M, the less the metal oxide powder M is likely to aggregate. Thus, to rapidly increase the temperature of the metal oxide powder M and reduce the aggregation of the metal oxide powder M, it is preferable that the rotation speed of the stirring blade 140 in the heating step S10 is high. The rotation speed of the stirring blade 140 in the heating step S10 is, but is not limited to, preferably not less than 85 rpm and not more than 200 rpm. The rotation speed of not less than 85 rpm rapidly increases the temperature of the metal oxide powder M and reduces the aggregation of the metal oxide powder M. Further, the rotation speed of not more than 200 rpm makes it possible to prevent the shear energy during stirring, which will be described later, from becoming larger than necessary.

In a case where a chemical agent to be added to the metal oxide powder M or a solution of the chemical agent to be added thereto is highly flammable, it is preferable that a gas inside the stirring vessel 110 is replaced with an inert gas such as nitrogen during the heating step S10 or after the heating step S10.

Then, after it has been confirmed with the temperature sensor (not illustrated) that the temperature inside the stirring vessel 110 reached a temperature not lower than 220° C. again, the chemical agent is added to the metal oxide powder M through the nozzle 160, and the metal oxide powder M and the chemical agent are mixed while being stirred by the stirring blade 140 (S20: mixing step).

A method of adding the chemical agent is not particularly limited. However, to chemical-treat the metal oxide powder M more uniformly, it is preferable to spray the chemical agent into the stirring vessel 110. In a case where the chemical agent is a low-viscosity liquid, the chemical agent in the form of a stock solution may be sprayed into the stirring vessel 110. Alternatively, in a case where the chemical agent is a solid or a high-viscosity liquid, a solution of the chemical agent, after the chemical agent has been dissolved in a solvent, may be sprayed into the stirring vessel 110.

In the mixing step S20, the temperature of the metal oxide powder M is a temperature of not lower than 220° C., which is the temperature at which the metal oxide powder M is less likely to aggregate. In a case where the temperature of the metal oxide powder M is such a temperature, there is no need to increase the rotation speed of the stirring blade 140 in order to rapidly increase the temperature of the metal oxide powder M. Therefore, to prevent the shear energy during stirring from causing the aggregation of the metal oxide powder M, it is preferable that the rotation speed of the stirring blade 140 in the mixing step S20 is low.

However, in a case where the rotation speed of the stirring blade 140 is too low, the metal oxide powder M partially becomes close to a stationary state. This may cause part of the metal oxide powder M existing in a lower place of the stirring vessel 110 to aggregate under the weight of the other part of the metal oxide powder M existing in a higher place of the stirring vessel 110. Therefore, in order to maintain a fluid state of the metal oxide powder M, it is preferable that the rotation speed of the stirring blade 140 in the mixing step S20 is not excessively low.

Here, the following will consider the influence of a rotation speed n of the stirring blade 140 and a stirring power P of the motor 120 on the shear energy of the stirring device 100. First, it is generally known that the stirring power P of the motor 120 is represented by a product of a mass flow rate representing the circulating action of the stirring device 100 and the shear energy of the stirring device 100, as expressed in the following equation (1):

$$P = (\rho \times Q) \times (g \times H) \tag{1}$$

In the above equation (1), $\rho$ is a bulk density [kg/m$^3$] of the metal oxide powder M, Q is a discharge flow rate [m$^3$/s], g is a gravitational acceleration [m/s$^2$], and H is a suction head [m].

In the above equation (1), $(\rho \times Q)$ is a mass flow rate [kg/s] representing the circulating action of the stirring device 100. Further, $(g \times H)$ represents the shear energy [J/kg] given to the metal oxide powder M per unit weight by the stirring device 100. In order to reduce the aggregation of the metal oxide powder M, it is preferable to reduce the shear energy $(g \times H)$ that can cause the aggregation.

Further, it is generally known that the discharge flow rate Q is expressed by the following equation (2):

$$Q = Nq \times Di^3 \times n \tag{2}$$

In the above equation (2), Nq is a constant determined by the shape of the stirring blade, Di is a blade diameter of the stirring blade, and n is a rotation speed of the stirring blade. By substituting the above equation (2) into the above equation (1) and modifying the above equation (1) with respect to the shear energy $(g \times H)$, the following equation (3) is obtained.

$$g \times H = \frac{P}{\rho \times n} \times \frac{1}{Nq \times Di^3} \tag{3}$$

In the above equation (3), $1/(Nq \times Di^3)$ is a constant determined by the shape and size of the stirring blade, as described above. Therefore, in order to reduce the shear energy, it is preferable to decrease $P/(\rho \cdot n)$.

According to diligent study conducted by the inventor of the present invention, the rotation speed of the stirring blade 140 is preferably not less than 40 rpm and not more than 75 rpm, since such a rotation speed decreases $P/(\rho \cdot n)$ and reduces the shear energy of the stirring device 100.

Then, after the chemical treatment of the metal oxide powder M is completed, the valve of the outlet 170 is opened to allow the chemical-treated metal oxide powder M to flow out through the outflow pipe 171 together with the flow of a gas such as air or nitrogen.

According to the above configuration, the inside of the stirring vessel 110 is rapidly heated to the temperature at which the metal oxide powder M is less likely to aggregate. This makes the metal oxide powder M less likely to aggregate. Further, until the inside of the stirring vessel 110 is heated to the temperature at which the metal oxide powder M is less likely to aggregate, the rotation speed of the stirring blade 140 is relatively increased so that the metal oxide powder M flows effectively. Then, after the inside of the stirring vessel 110 has been heated to a temperature that is equal to or higher than the temperature at which the metal oxide powder M is less likely to aggregate, the rotation speed of the stirring blade 140 is decreased to prevent unnecessarily large shear energy from being given to the metal oxide powder M. Thus, it is possible to appropriately reduce the aggregation of the metal oxide powder M in each step required for the chemical treatment of the metal oxide powder M.

[5. Method for Producing Chemical-Treated Metal Oxide Powder]

The chemical-treated metal oxide powder can be produced by a method for producing chemical-treated metal oxide powder, the method including the above-described heating step S10 and mixing step S20, wherein the rotation speed of the stirring blade 140 is lower in the mixing step S20 than in the heating step S10.

Aspects of the present invention can also be expressed as follows:

A method for chemical treatment of metal oxide powder in accordance with an aspect of the present invention includes: a heating step of introducing metal oxide powder having a specific surface area of not less than 20 $m^2/g$ and not more than 40 $m^2/g$ into a stirring vessel which has been preheated to a temperature of not lower than 220° C., and, while stirring the metal oxide powder with a stirring blade, performing heating so that a temperature inside the stirring vessel which temperature has been decreased by the introduction of the metal oxide powder reaches the temperature of not lower than 220° C. again; and a mixing step of, after the temperature inside the stirring vessel has reached the temperature of not lower than 220° C. again in the heating step, adding a chemical agent to the metal oxide powder and mixing the metal oxide powder and the chemical agent while stirring the metal oxide powder and the chemical agent with the stirring blade, wherein a rotation speed of the stirring blade is lower in the mixing step than in the heating step.

According to the above configuration, the inside of the stirring vessel is rapidly heated to the temperature at which the metal oxide powder is less likely to aggregate. This makes the metal oxide powder less likely to aggregate. Further, until the inside of the stirring vessel is heated to the temperature at which the metal oxide powder is less likely to aggregate, the rotation speed of the stirring blade is relatively increased so that the metal oxide powder flows effectively. Then, after the inside of the stirring vessel has been heated to a temperature that is equal to or higher than the temperature at which the metal oxide powder is less likely to aggregate, the rotation speed of the stirring blade is decreased to prevent unnecessarily large shear energy from being given to the metal oxide powder. Thus, it is possible to appropriately reduce the aggregation of the metal oxide powder in each step required for the chemical treatment of the metal oxide powder.

The method for chemical treatment of metal oxide powder in accordance with an aspect of the present invention may be such that the rotation speed of the stirring blade in the heating step is not less than 85 rpm and not more than 200 rpm, and the rotation speed of the stirring blade in the mixing step is not less than 40 rpm and not more than 75 rpm. According to the above configuration, it is possible to more appropriately reduce the aggregation of the metal oxide powder in each step required for the chemical treatment of the metal oxide powder.

The method for chemical treatment of metal oxide powder in accordance with an aspect of the present invention may be such that the metal oxide powder is silica or composite metal oxide powder containing silica as a main component. According to the above configuration, even though the metal oxide powder is silica having high aggregability or composite metal oxide powder containing silica as a main component, it is possible to appropriately reduce the aggregation of the metal oxide powder.

The method for chemical treatment of metal oxide powder in accordance with an aspect of the present invention may be such that the chemical agent is a surface treatment agent.

According to the above configuration, it is possible to surface-treat the metal oxide powder with the surface treatment agent while appropriately reducing the aggregation of the metal oxide powder.

A method for producing chemical-treated metal oxide powder in accordance with an aspect of the present invention includes: a heating step of introducing metal oxide powder having a specific surface area of not less than 20 $m^2/g$ and not more than 40 $m^2/g$ into a stirring vessel which has been preheated to a temperature of not lower than 220° C., and, while stirring the metal oxide powder with a stirring blade, performing heating so that a temperature inside the stirring vessel which temperature has been decreased by the introduction of the metal oxide powder reaches the temperature of not lower than 220° C. again; and a mixing step of, after the temperature inside the stirring vessel has reached the temperature of not lower than 220° C. again in the heating step, adding a chemical agent to the metal oxide powder and mixing the metal oxide powder and the chemical agent while stirring the metal oxide powder and the chemical agent with the stirring blade, wherein a rotation speed of the stirring blade is lower in the mixing step than in the heating step.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

Examples of the present invention will be described below. Note that physical property values were measured by the following methods.

The specific surface area of powder was measured by the nitrogen adsorption BET single-point method using a specific surface area measuring device SA-1000 manufactured by Shibata Rikagaku Co., Ltd.

The particle diameter was measured as a median diameter of the volume-based particle size distribution obtained by an image analysis method. A specific method for measuring the volume-based particle size distribution is as follows. First, about 0.03 g of silica as the metal oxide powder M was weighed, was added to 30 mL of ethanol, and was then dispersed for 5 minutes using an ultrasonic cleaner to obtain a silica slurry. This slurry was dropped onto a silicon wafer and dried, and a 100,000-fold image was taken using a field emission scanning electron microscope S-5500 manufactured by Hitachi High-Technologies Corporation. Then, from such an image, an equivalent circle diameter was determined using the image analysis software "A-zo kun" manufactured by Asahi Kasei Engineering Corporation, and the volume-based particle size distribution was obtained.

The bulk density was measured by a static method according to JIS 5101-12-1: Test methods for pigments, except that a sieve with a mesh size of 2 mm was used.

In all Examples and Comparative Examples, silica powder having a specific surface area of 30 $m^2/g$ and a particle diameter of 125 nm and produced by burning an organosilicon compound was used as the metal oxide powder M.

Example 1

Influence of Temperature on the Degree of Aggregation of Metal Oxide Powder

To determine the influence of a temperature on the degree of aggregation of the metal oxide powder M, the metal oxide powder M was stirred inside the stirring vessel 110 which was set to various temperatures, and changes over time in the bulk density of the metal oxide powder M were measured. The volume of the stirring vessel 110 used was 20 L.

First, after it was confirmed that the inside of the stirring vessel 110 had been preheated to room temperature (25° C.), 150° C., 265° C., or 300° C., 1 kg of silica was introduced into the stirring vessel 110 and was stirred with the stirring blade 140 at a rotation speed of 100 rpm. At each temperature, a silica sample was taken out from the inside of the stirring vessel 110 every time about 20 minutes elapsed, and the bulk density was measured. The results of the measurement of the bulk density are shown in FIG. 4.

Figure 4:
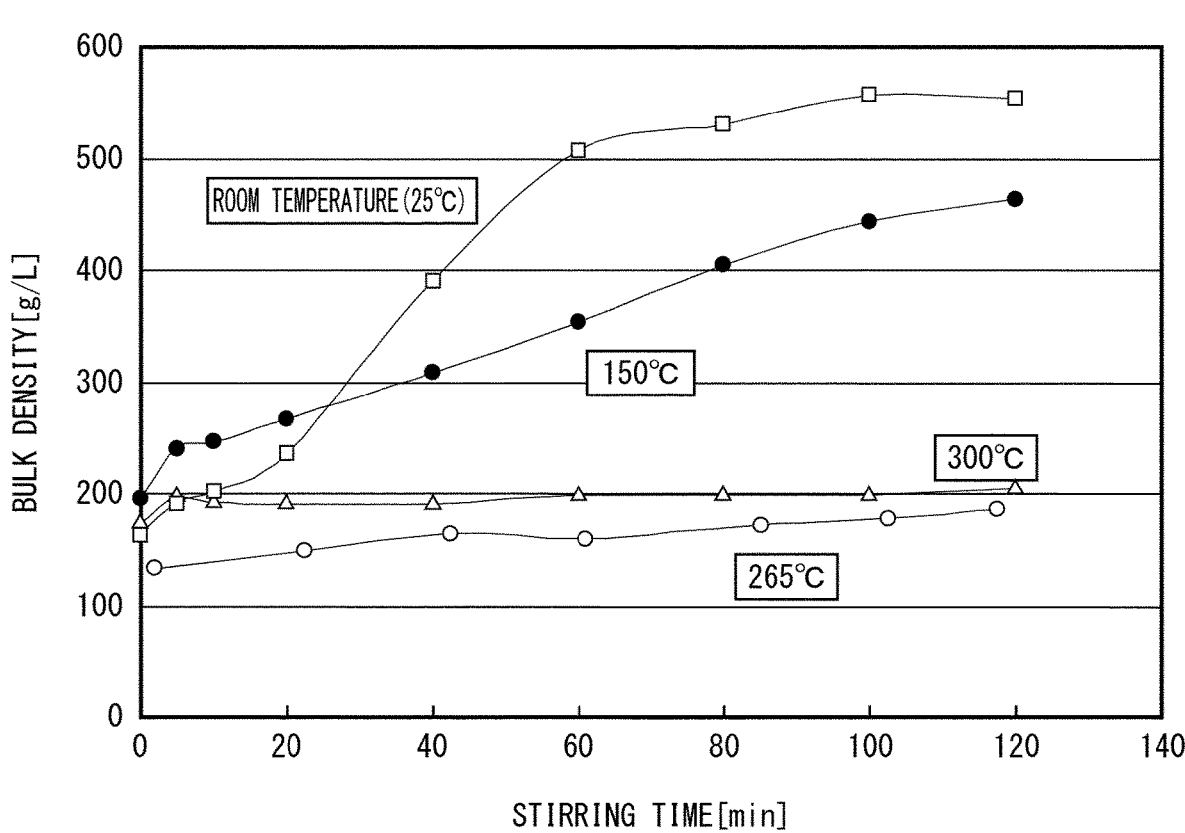
FIG. 4 is a graph showing a relationship between a stirring time and a bulk density of the metal oxide powder when metal oxide powder was stirred at various temperatures, in accordance with Example 1 of the present invention.

As illustrated in FIG. 4, it was shown that in a case where the temperature inside the stirring vessel 110 was room temperature or 150° C., the bulk density of the silica increased as the stirring time increased. This suggests that the longer the stirring time, the more the silica aggregates. On the other hand, in a case where the temperature inside the stirring vessel 110 was 265° C. and 300° C., the bulk density of the silica hardly increased even when the stirring time increased. This suggests that the degree of aggregation of the silica is low, and fine particles of the silica are separated from each other.

Figure 5:
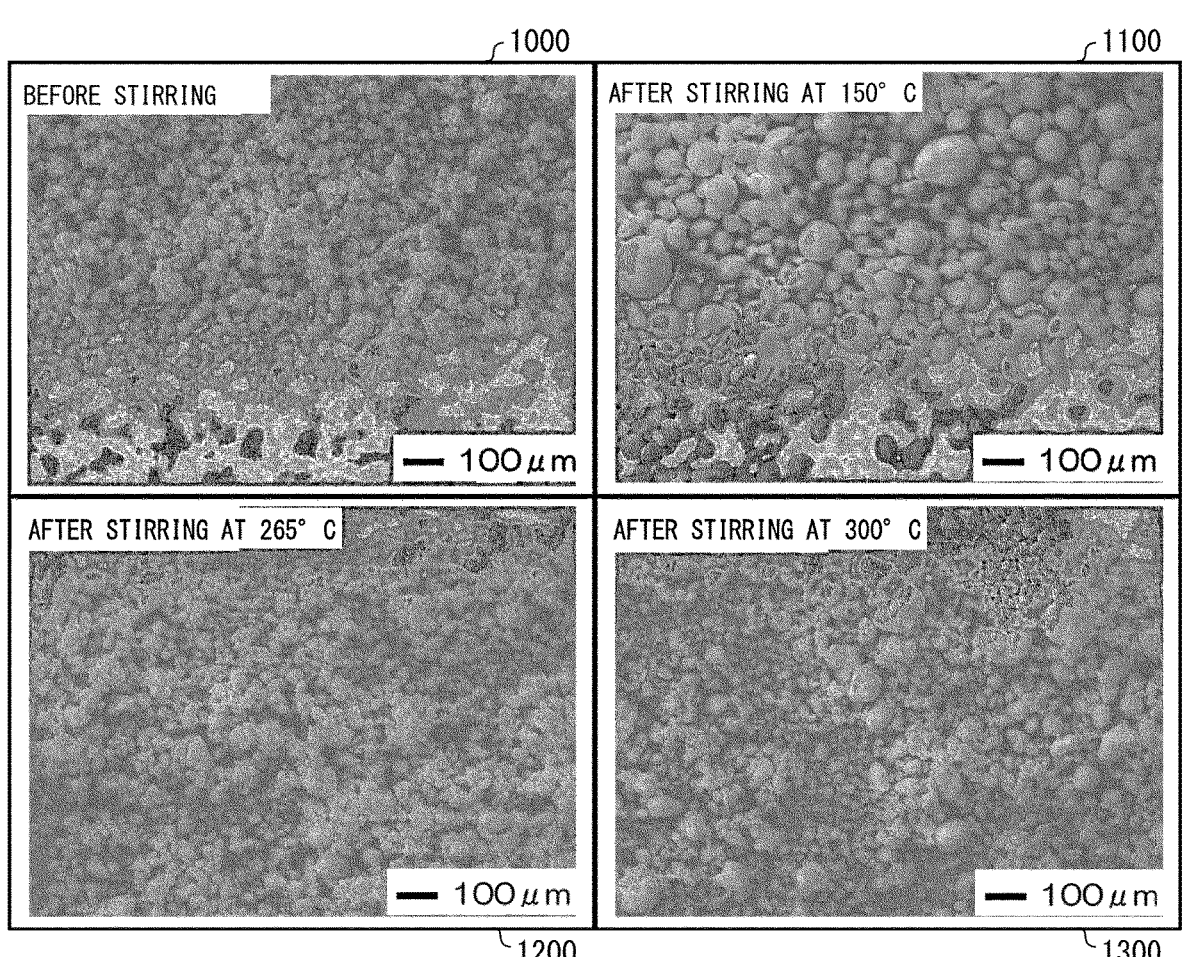
FIG. 5 is a view showing scanning electron microscope (SEM) photographs of metal oxide powder before and after stirring, in accordance with Example 1 of the present invention.

FIG. 5 shows scanning electron microscope (SEM) photographs of the silica before stirring and after 120 minutes of stirring at 150° C., 265° C., and 300° C. As shown in 1000 in FIG. 5, the silica before stirring contained a large amount of non-aggregated fine particles. As shown in a photograph 1100 in FIG. 5, the silica after 120 minutes of stirring at 150° C. contained a large amount of densely aggregated large particles having a particle diameter of about not less than 10 μm. As shown in photographs 1200 and 1300 in FIG. 5, the silica after 120 minutes of stirring at 265° C. and 300° C. contained a large amount of non-aggregated fine particles, as in the case of the silica before stirring shown in the photograph 1000 in FIG. 5.

Thus, it was shown that heating at a temperature of not lower than 265° C. reduces the aggregation of the silica.

Example 2

Influence of the Rotation Speed of the Stirring Blade on the Shear Energy of the Stirring Device As described above, to reduce the shear energy of the stirring device 100, it is preferable to decrease $P/(\rho \cdot n)$, which is a value obtained by dividing the stirring power P by a product of the bulk density $\rho$ of the metal oxide powder M and the rotation speed n of the stirring blade. Thus, the stirring power P and the bulk density $\rho$ when the rotation speed n was changed were measured, and the influence of the rotation speed n on $P/(\rho \cdot n)$ and the bulk density $\rho$ was determined.

The volume of the stirring vessel 110 used was 2 m³. The amount of silica introduced into the stirring vessel 110 was 200 kg. The temperature inside the stirring vessel 110 was 250° C., and the stirring time was 5 minutes at each rotation speed. The results are shown in FIG. 6.

Figure 6:
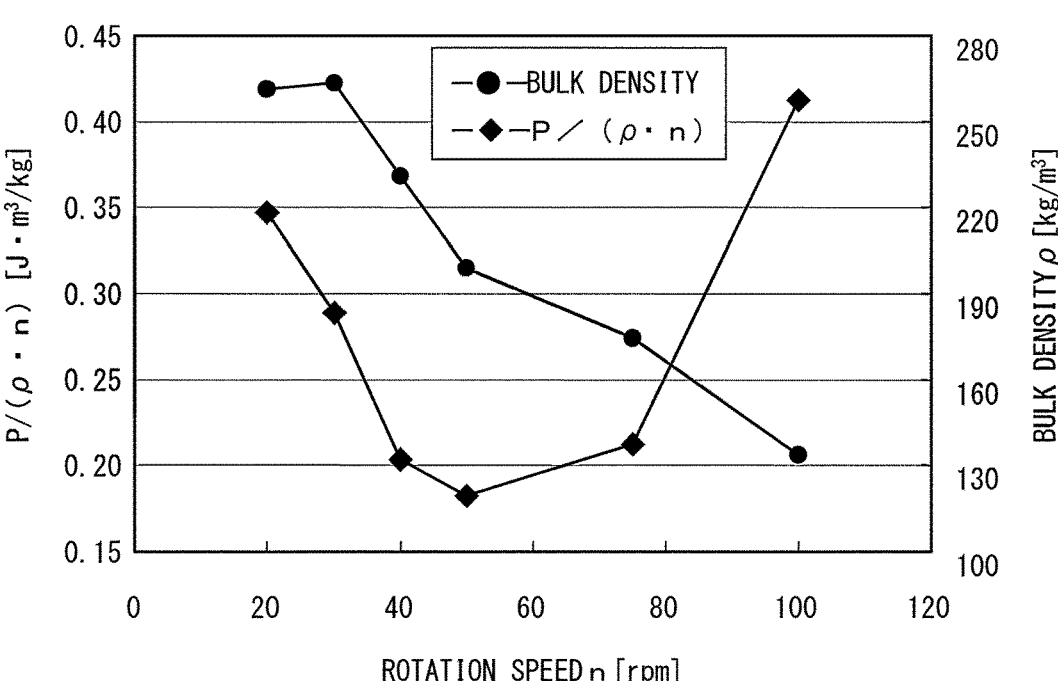
FIG. 6 is a graph showing a relationship between a rotation speed and shear energy, in accordance with Example 2 of the present invention.

As indicated by circle markers in FIG. 6, it was shown that the higher the rotation speed of the stirring blade 140, the lower the bulk density. This is considered to be because the loosely aggregated metal oxide powder M was crushed by stirring, and air was entrained between the particles of the metal oxide powder M.

Further, as indicated by square markers in FIG. 6, it was shown that $P/(\rho \cdot n)$ becomes particularly small in the case where the rotation speed of the stirring blade 140 is not less than 40 rpm and not more than 75 rpm. Therefore, it was suggested that stirring with the stirring blade 140 at the rotation speed of not less than 40 rpm and not more than 75 rpm effectively reduced the shear energy of the stirring device 100 and reduced the aggregation of the metal oxide powder M.

Example 3

Influence of the Rotation Speed of the Stirring Blade on Temperature Increase of Metal Oxide Powder When the metal oxide powder M is introduced into the stirring vessel 110, it is expected that the higher the rotation speed of the stirring blade 140, the more rapidly and more uniformly the temperature of the metal oxide powder M increases. Thus, the influence of the rotation speed of the stirring blade 140 on a temperature increase of the metal oxide powder M was determined.

Figure 7:
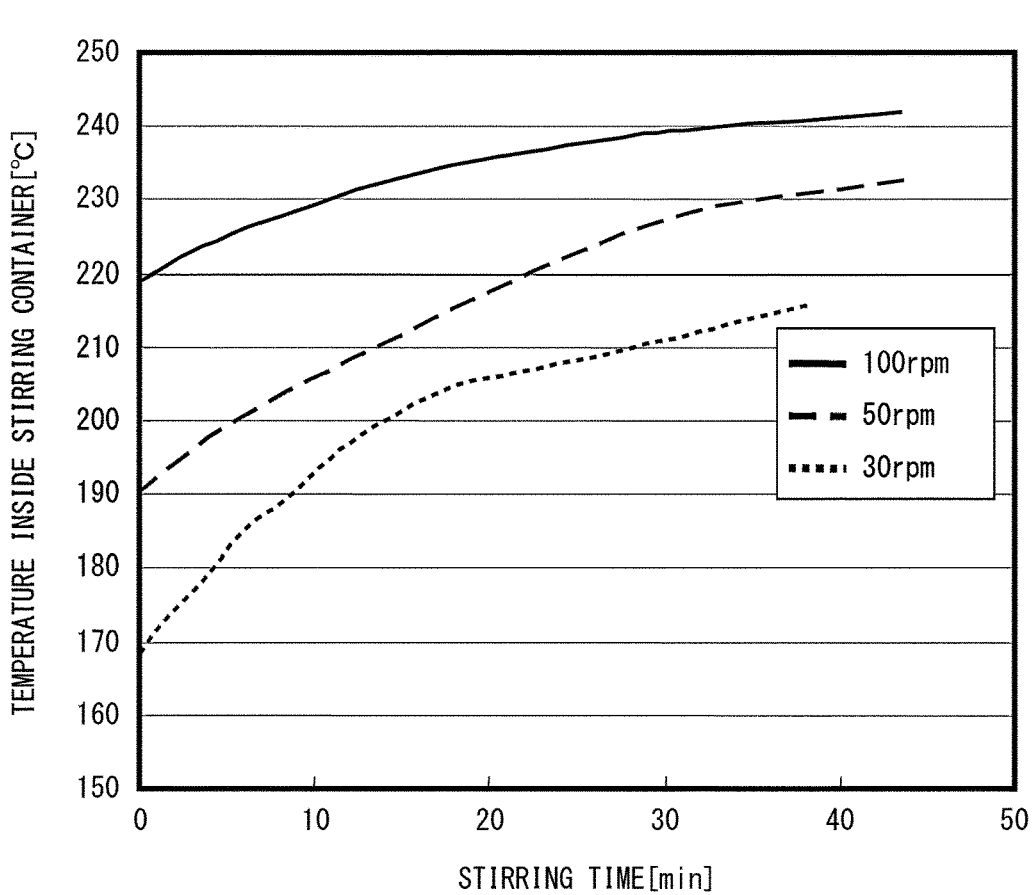
FIG. 7 is a graph showing a relationship between a stirring time and a temperature inside a stirring vessel when metal oxide powder was stirred at various rotation speeds, in accordance with Example 3 of the present invention.

The volume of the stirring vessel 110 used was 2 m³, and the rotation speed of the stirring blade 140 was 30 rpm, 50 rpm, or 100 rpm. The amount of silica introduced into the stirring vessel 110 was 200 kg. The temperature inside the stirring vessel 110 before the metal oxide powder M was introduced was 250° C. The results are shown in FIG. 7.

At all of the rotation speeds, a stirring time of 0 minute indicates a time when the introduction of the metal oxide powder M was completed. In a case where the rotation speed of the stirring blade 140 was 30 rpm, the temperature inside the stirring vessel 110 did not reach 220° C. even when 40 minutes elapsed after the introduction of the metal oxide powder M had been completed. On the other hand, the higher the rotation speed of the stirring blade 140, the more rapidly the temperature inside the stirring vessel 110 increased. In a case where the rotation speed of the stirring blade 140 was 100 rpm, the temperature inside the stirring vessel 110 reached 220° C. immediately after the introduction of the metal oxide powder M had been completed.

Example 4

Chemical Treatment of Metal Oxide Powder

The metal oxide powder M was subjected to chemical treatment using the stirring device 100 in accordance with an embodiment of the present invention. The volume of the stirring vessel 110 used was 2 m². The chemical agent used was hexamethyldisilazane (HMDS).

First, the stirring vessel 110 was heated by the jacket 150. After it was confirmed that the inside of the stirring vessel 110 had been preheated to 250° C., 200 kg of silica was introduced into the stirring vessel 110 and was stirred with the stirring blade 140 at a rotation speed of 100 rpm. At this time, the temperature inside the stirring vessel 110 was decreased to 220° C. by the introduction of the silica. While a gas inside the stirring vessel 110 was replaced with nitrogen, and while the silica was stirred with the stirring blade 140, the stirring vessel 110 was heated for 40 minutes until the decreased temperature inside the stirring vessel 110 reached 250° C. again (S10: heating step).

Figure 8:
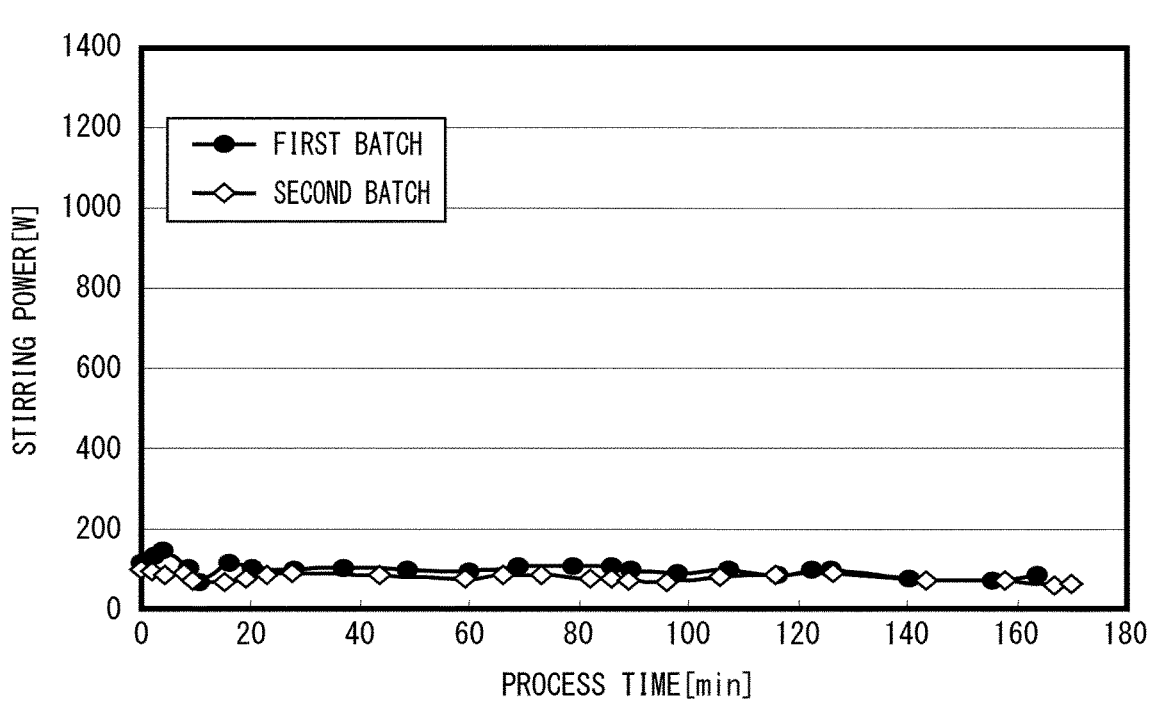
FIG. 8 is a graph showing a relationship between a process time and a stirring power, in accordance with Example 4 of the present invention.

After it was confirmed that the temperature inside the stirring vessel 110 had reached 250° C. again, the rotation speed of the stirring blade 140 was set to 50 rpm. Then, the stirring vessel 110 was sealed, and 0.9 kg of steam was introduced over 10 minutes, and then 8 kg of liquid HMDS was added by being sprayed into the stirring vessel 110. After the addition of HMDS, this state was maintained for 30 minutes, and the silica was subjected to chemical treatment (S20: mixing step). FIG. 8 shows changes over time in the stirring power of the motor 120 in the heating step S10 and the mixing step S20.

After the mixing step S20, the pressure inside the stirring vessel 110 was released, and the gas inside the stirring vessel 110 was replaced with nitrogen to remove unreacted HMDS and a by-product of reaction.

In Example 4, the stirring power of the motor 120 hardly changed over time. This suggests that the fluid state of the silica hardly changed throughout the heating step S10 and the mixing step S20, and the aggregation of the silica was extremely little.

In addition, the collection rate of the chemical-treated silica was as high as 96% in the first batch and 100% in the second batch. This indicates that extremely little adhesion to the inside of the stirring vessel 110 due to the aggregation of the silica was achieved by the method of Example 4.

Comparative Example 1

Figure 9:
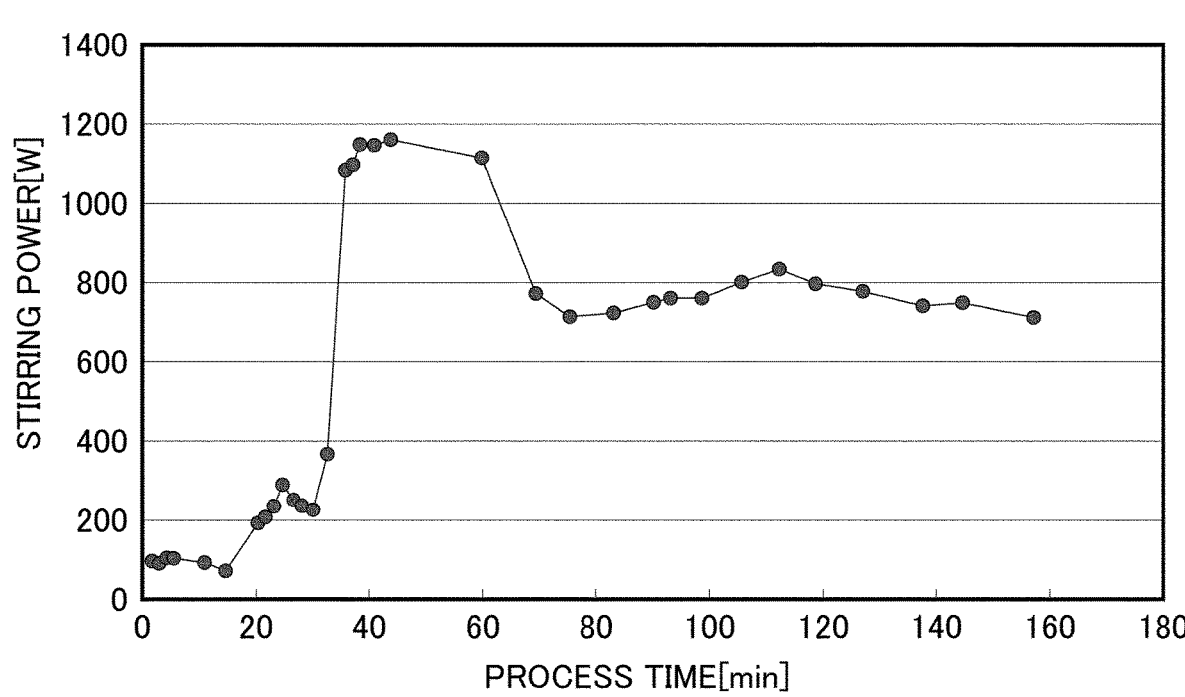
FIG. 9 is a graph showing a relationship between a process time and a stirring power, in accordance with Comparative Example 1.

Chemical treatment of the metal oxide powder M in accordance with Comparative Example 1 was carried out in substantially the same manner as the chemical treatment in Example 4, except that the rotation speed of the stirring blade 140 was set to 50 rpm throughout the heating step S10 and the mixing step S20 in Example 4. In Comparative Example 1, a time lapsed until the temperature inside the stirring vessel 110 reached 250° C. again was longer than in Example 4. Accordingly, steam was introduced 60 minutes after the completion of the silica introduction, and then HMDS was added. FIG. 9 shows changes over time in the stirring power of the motor 120 in the heating step S10 and the mixing step S20.

In Comparative Example 1, the stirring power of the motor 120 significantly increased about 40 minutes after the completion of the silica introduction. This suggests that the silica aggregated under stirring with the stirring blade 140 at the rotation speed of 50 rpm, and a large load was applied to the motor 120. It is considered that the reason why the silica aggregated is that since setting the rotation speed of the stirring blade 140 to be lower than that in Example 4 caused a decreased rate of temperature increase of the silica, the silica was stirred for a long time at a temperature of not higher than 220° C. at which the silica is likely to aggregate.

The collection rate of the chemical-treated silica was as low as 68%. Further, after the chemical-treated silica was taken out of the stirring vessel 110, adhesion of aggregated silica to the inside of the stirring vessel 110 was observed.

Comparative Example 2

Figure 10:
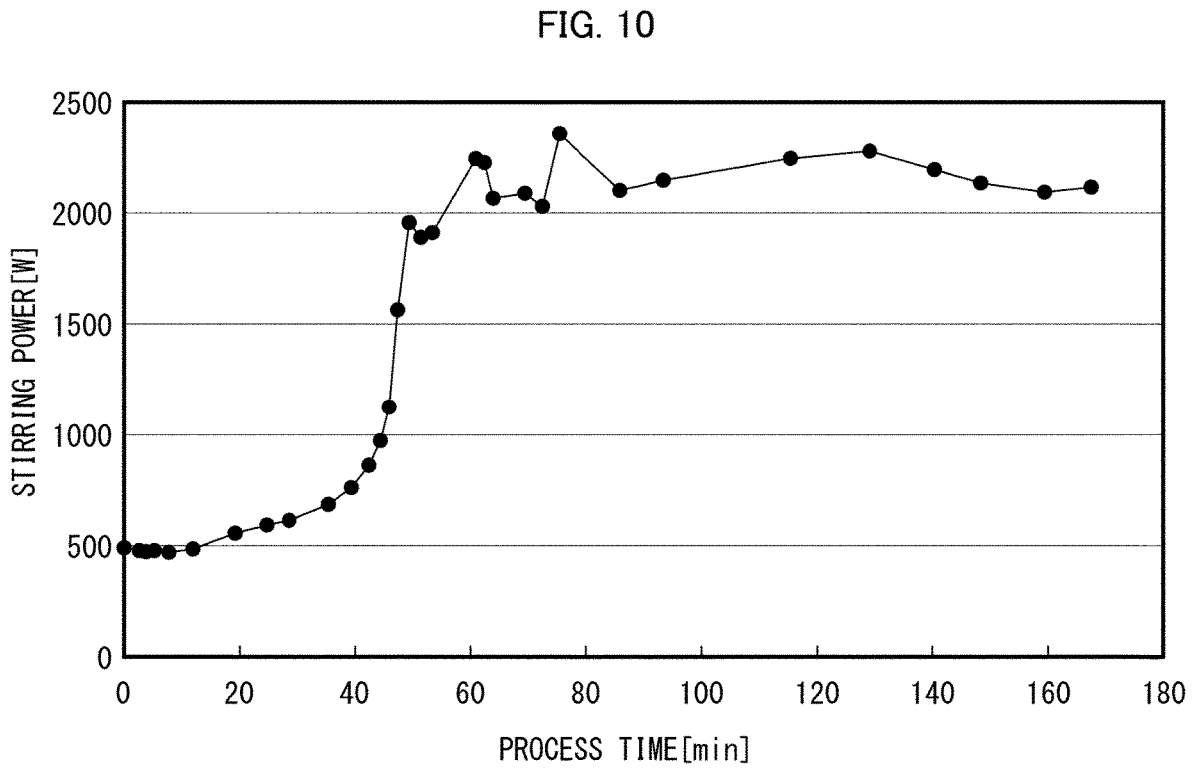
FIG. 10 is a graph showing a relationship between a process time and a stirring power, in accordance with Comparative Example 2.

Chemical treatment of the metal oxide powder M in accordance with Comparative Example 2 was carried out as in Example 4, except that the rotation speed of the stirring blade 140 was set to 100 rpm throughout the heating step S10 and the mixing step S20 in Example 4. FIG. 10 shows changes over time in the stirring power of the motor 120 in the heating step S10 and the mixing step S20.

In Comparative Example 2, the stirring power of the motor 120 significantly increased about 50 minutes after the completion of the silica introduction. This suggests that continuous stirring with the stirring blade 140 at the rotation speed of 100 rpm caused the aggregation of the silica, and a large load was applied to the motor 120. It is considered that the reason why the silica aggregated is that since the rotation speed of the stirring blade 140 was continuously set to a high rotation speed, the shear energy caused by the stirring was applied to the silica.

The collection rate of the chemical-treated silica was as low as 66%. Further, after the chemical-treated silica was taken out of the stirring vessel 110, adhesion of aggregated silica to the inside of the stirring vessel 110 was observed.

INDUSTRIAL APPLICABILITY

The present invention can be suitably used in the field of, for example, an external additive for toner particles.

REFERENCE SIGNS LIST 100 stirring device
110 stirring vessel
140 stirring blade
141 anchor blades
142 paddle blades
150 jacket
160 nozzle
S10 heating step
S20 mixing step

The invention claimed is:

1. A method for producing chemical-treated metal oxide powder, the method comprising:
   a heating step of introducing metal oxide powder having a specific surface area of not less than 20 $m^2$/g and not more than 40 $m^2$/g into a stirring vessel which has been preheated to a temperature of not lower than 220° C., and, while stirring the metal oxide powder with a stirring blade, performing heating so that a temperature inside the stirring vessel which temperature has been decreased by the introduction of the metal oxide powder reaches the temperature of not lower than 220° C. again; and
   a mixing step of, after the temperature inside the stirring vessel has reached the temperature of not lower than 220° C. again in the heating step, adding a chemical agent to the metal oxide powder and mixing the metal oxide powder and the chemical agent while stirring the metal oxide powder and the chemical agent with the stirring blade,
   wherein a rotation speed of the stirring blade is lower in the mixing step than in the heating step, and P/(ρ·n) is more than 0.15 and less than 0.25 where P denotes a stirring power of a motor that rotates the stirring blade, ρ denotes a bulk density of the metal oxide powder, and n denotes the rotation speed of the stirring blade.

2. The method according to claim 1, wherein the rotation speed of the stirring blade in the heating step is not less than 85 rpm and not more than 200 rpm, and the rotation speed of the stirring blade in the mixing step is not less than 40 rpm and not more than 75 rpm.

3. The method according to claim 1, wherein the metal oxide powder is silica or composite metal oxide powder containing silica as a main component.

4. The method according to claim 1, wherein the chemical agent is a surface treatment agent.

* * * * *